United States Patent [19]

Swanson et al.

[11] 4,303,254
[45] Dec. 1, 1981

[54] RETRACTABLE CASTER WHEEL FOR A TRAILER

[76] Inventors: Rodney C. Swanson, 7720 Lloyd Dr., Cherry Valley, Ill. 61016; James O. Hutchens, 837 Baxter Wood La., Janesville, Wis. 53545

[21] Appl. No.: 142,102

[22] Filed: Apr. 21, 1980

[51] Int. Cl.³ .............................................. B62D 35/00
[52] U.S. Cl. ........................................ 280/43.2; 9/1.2; 280/414 R
[58] Field of Search ................ 9/1.2; 280/476 R, 763, 280/767, 43.2, 43.13, 414 R; 414/462, 538, 500; 244/102 R

[56] References Cited

U.S. PATENT DOCUMENTS

| | | | |
|---|---|---|---|
| 2,296,789 | 9/1942 | Johnson | 280/33.4 |
| 2,360,988 | 10/1944 | Thomas | 244/102 R |
| 2,595,453 | 5/1952 | Gilmore | 280/33.4 |
| 2,627,424 | 2/1953 | Chapin | 280/33.4 |
| 2,810,588 | 10/1957 | Rozett | 280/150.5 |
| 4,157,200 | 6/1979 | Johnson | 9/1.2 X |

Primary Examiner—David M. Mitchell
Assistant Examiner—Norman L. Stack, Jr.
Attorney, Agent, or Firm—Vernon J. Pillote

[57] ABSTRACT

A retractable caster wheel for a trailer in which the caster wheel is mounted on the tongue of a trailer for swivelling movement about an upright caster axis and also for swinging movement between a lowered support position and a raised storage position, and in which the caster axis remains upright during swinging of the caster wheel between its lowered and raised positions. The caster wheel can be positioned and used at positions intermediate its lowered and raised positions to support the trailer tongue at different heights and mechanism is advantageously provided for positively adjusting the caster wheel between its lowered and raised positions.

14 Claims, 9 Drawing Figures

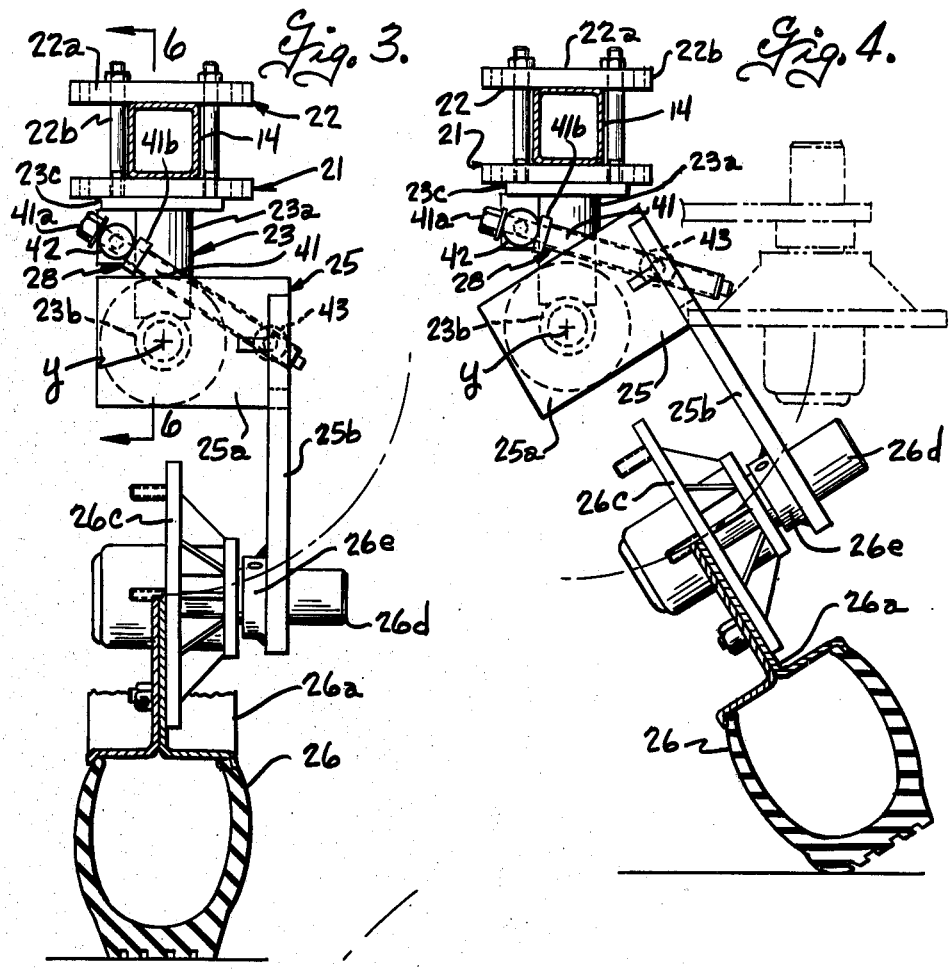
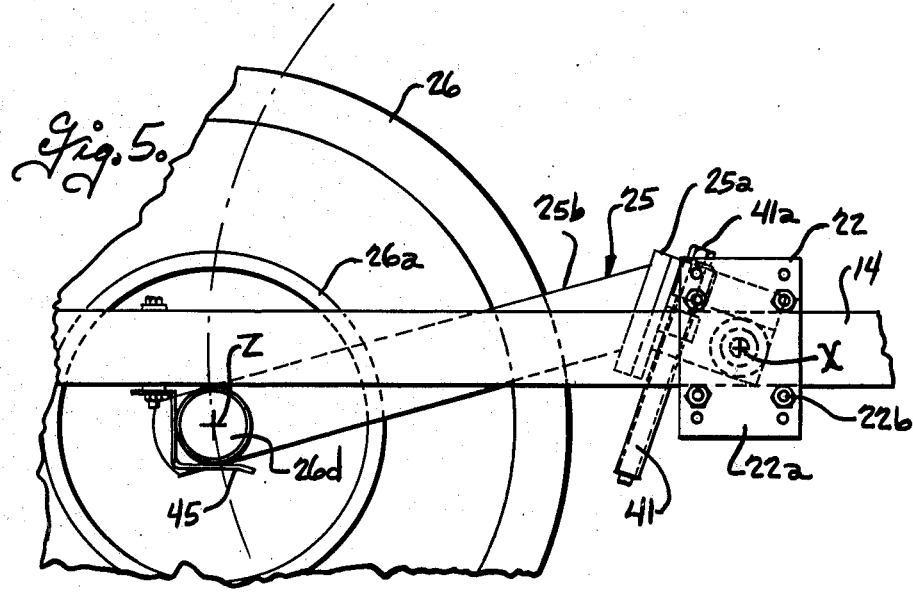

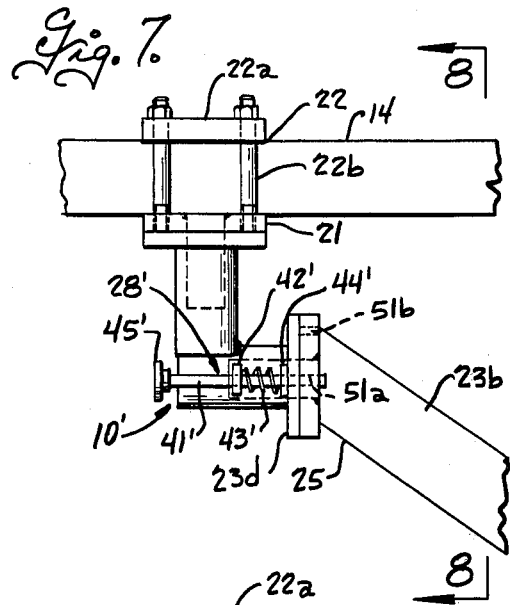
Fig. 7.
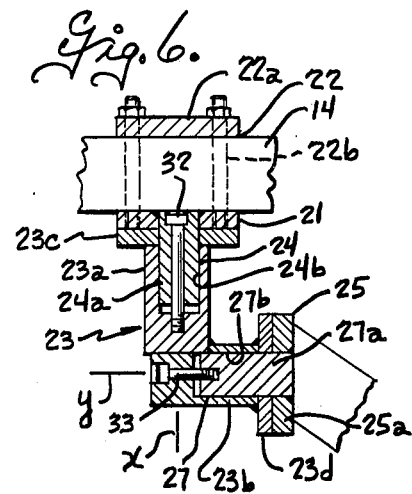
Fig. 6.
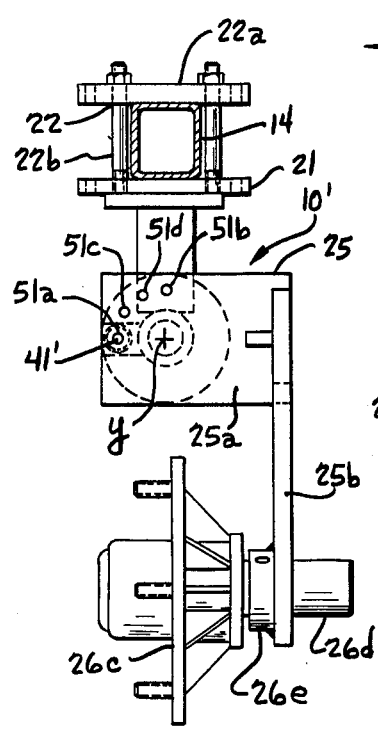
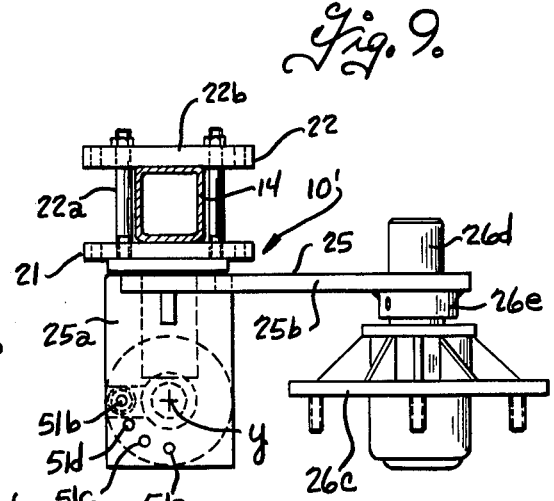
Fig. 9.
Fig. 8.

RETRACTABLE CASTER WHEEL FOR A TRAILER

BACKGROUND OF THE INVENTION

It has heretofore been proposed, for example as shown in U.S. Pat. Nos. 2,296,789, 2,595,453, 2,627,424, and 3,810,588, to mount a caster wheel on the tongue of a trailer for swivelling movement about an upright caster axis, to support the trailer tongue when the tongue is not attached to a towing vehicle, and which caster wheel mount was also arranged to allow the caster wheel to be swung from a lower tongue support position, to a raised storage position during towing of the trailer. However, in such prior caster wheel attachments for trailers, the attitude of the caster axis changes from a vertical attitude when the wheel is in its lower position to a horizontal attitude when the wheel is in its raised position. Because of the changing attitude of the caster axis during movement from its lowered to its raised position, such prior caster wheel attachments were not adapted to function as caster wheels at any position other than the fully lowered position. In addition, the change in attitude of the caster axis during movement of the caster wheel from its lowered to its raised position made it difficult to control swivelling of the caster wheel about the caster axis, since the caster wheel tends to gravitate to a position in which the center of mass of the wheel is offset below the caster axis. Further, the caster wheel attachments shown in the aforementioned patents are not positively adjustable between their lowered and raised positions and could not be utilized to adjustably elevate the trailer tongue to facilitate hitching or unhitching of the trailer from the towing vehicle.

SUMMARY OF THE INVENTION

It is the object of the present invention to overcome the disadvantages of the prior retractable caster wheels for trailers by providing a retractable caster wheel in which the swivel axis remains vertical during swinging of the caster wheel from a lower support position to a raised storage position.

Still another object of this invention is to provide a retractable caster wheel for a trailer in which the caster wheel can be positively adjusted to elevate and lower the trailer tongue to facilitate hitching and unhitching of the trailer from the vehicle, and in which the retractable caster wheel is operative to movably support the trailer tongue at positions intermediate its lowered and raised positions.

Accordingly, the present invention provides, in a wheeled trailer having a tongue adapted for connection to a towing vehicle, a retractable wheel support for the tongue comprising a stationary mounting bracket and means for rigidly attaching the stationary mounting bracket to the trailer tongue, a swivel bracket, means mounting the swivel bracket on the mounting bracket for turning movement relative thereto by the generally upright swivel axis, a wheel support bracket and a wheel rotatably mounted on the wheel support bracket, means mounting the wheel support bracket on the swivel bracket for turning relative thereto about a generally horizontal swing axis between a lowered position in which the wheel axis is generally horizontal and a raised position in which the wheel axis is generally upright, and means acting between the swivel bracket and the wheel support bracket selectively operable to retain the wheel support bracket in the lowered position relatively to the swivel bracket.

These, together with other objects, features and advantages of this invention will be more readily understood by reference to the following detailed description when taken in conjunction with the accompanying drawings wherein:

FIG. 3 is a transverse vertical sectional view taken on the plane 3—3 of FIG. 2;

FIG. 4 is transverse vertical sectional view showing the caster wheel in an intermediate position;

FIG. 5 is a fragmentary horizontal sectional view taken on the plane 5—5 of FIG. 2, and illustrating the caster wheel in its raised or storage position;

FIG. 6 is a fragmentary vertical sectional view taken on the plane 6—6 of FIG. 3;

FIG. 7 is a fragmentary side elevational view illustrating a modified caster wheel attachment;

FIG. 8 is a fragmentary transverse vertical sectional view taken on the plane 8—8 of FIG. 7; and FIG. 9 is a fragmentary transverse sectional view illustrating the caster wheel of FIG. 7 in a raised position.

Figure 1:
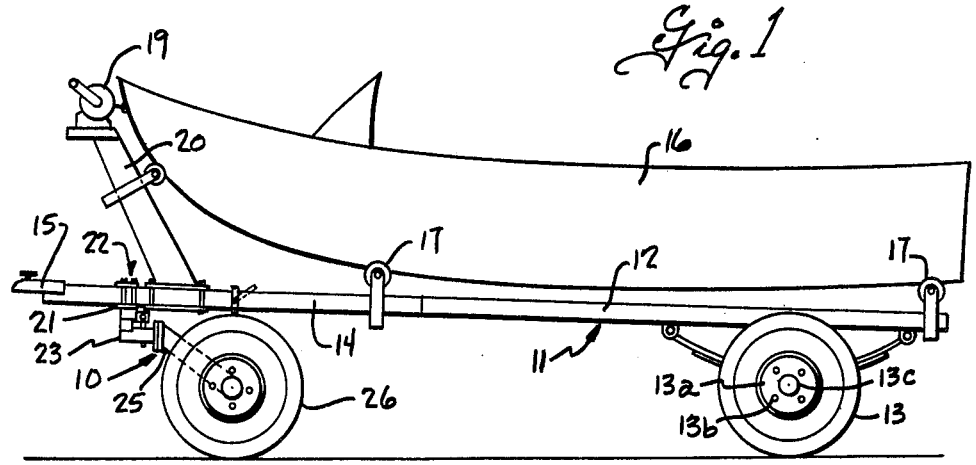
FIG. 1 is a side elevational view of a trailer embodying the caster wheel attachment of the present invention.

The retractable caster wheel 10 of the present invention is adapted for use on various different trailers 11 to support the tongue of the trailer when the trailer is not hitched to a towing vehicle. The caster wheel attachment 10 is herein shown applied to a boat trailer of conventional design including a frame 12 supported adjacent its rear end on support wheels 13, and having a tongue 14 at its forward end. A trailer hitch 15, also of conventional design, is attached to the forward end of the tongue for connecting the trailer to the hitch on a towing vehicle. In the boat trailer illustrated, a boat 16 is supported as on rollers 17 mounted on the frame and a winch 19 is provided on a post 20 mounted on the trailer tongue, to facilitate loading and unloading the boat from the trailer.

The retractable caster wheel includes a stationary mounting bracket 21 and an attaching means 22 for rigidly attaching the stationary mounting bracket to the trailer tongue. A swivel bracket 23 is mounted on the stationary mounting bracket 22 by a first rotary mounting means 24 (FIG. 6) for turning relative thereto about an upright caster axis X that extends perpendicular to the underside of the trailer tongue 14. A wheel support bracket 25 having a support wheel 26 rotatably mounted thereon, is mounted on the swivel bracket by a second rotary mounting means 27 (FIG. 6) for turning movement relative thereto about a generally horizontal swing axis Y between a lowered position in which the axis Z of the wheel 26 is generally horizontal and a raised position in which the wheel axis is generally upright. A selectively operable wheel bracket retaining means 28 is connected to the swivel bracket 23 and wheel support bracket 25 to retain the wheel support bracket in one or more preset positions relative to the swivel bracket.

The mounting bracket 21 is adapted to underlie the trailer tongue 14 and any suitable attaching means 22 may be provided for rigidly securing the mounting bracket to the trailer tongue. In the embodiment shown, the means 22 for attaching the mounting bracket to the trailer tongue includes a plate 22a that overlies the trailer tongue 14 and bolts 22b that are threaded into tapped openings in the mounting bracket 21, and which extend through openings in the clamp plate. In order to accommodate trailer tongues of different widths, additional openings can be provided in the mounting bracket and clamp plate at relatively different center-to-center spacing, as best shown in FIG. 5, and bolts of different lengths can be used to accommodate tongues of different depth. Other attaching means can be utilized for rigidly attaching the mounting bracket to the trailer tongue and the bracket may, for example, be welded directly to the tongue.

The swivel bracket 23 has relatively transverse legs 23a and 23b arranged in a generally L-shaped configuration. In the embodiment shown, the swivel bracket 23 is conveniently formed by welding leg members 23a and 23b together at their adjacent ends to rigidly interconnect the same, and by welding flanges 23c and 23d on the ends of the leg members 23a and 23b. It is to be understood, however, that the swivel bracket can be otherwise fabricated and may, for example, be formed in a one-piece casting. As best shown in FIG. 6, the first rotary mounting means 24 for mounting the swivel bracket on the mounting bracket for turning movement about an upright caster axis includes a pintle 24a rigidly secured as by welding to the mounting bracket 21, to extend vertically downwardly from the mounting bracket 21, and a socket 24b in the leg 23a of the swivel bracket, that rotatably receives the pintle 24a. The swivel bracket is retained in assembled relation on the mounting bracket by a cap screw 32 that rotatably extends through a stepped bore in the pintle 24a and is threaded into the lower end of the leg 23a of the swivel bracket 23.

The second rotary mounting means 27 for rotatably supporting the wheel support bracket 25 on the swivel bracket 23 for turning movement on a generally horizontal swing axis Y is best shown in FIG. 6 and comprises a pintle 27a that is rigidly secured as by welding to a head 25a on the wheel support bracket 25. The pintle is rotatably received in a socket 27b in the leg 23b of the swivel bracket for turning movement relative thereto about a generally horizontal axis Y, and a cap screw 33 is rotatably received in a stepped bore in the leg 23b of the swivel bracket, and is threaded into the inner end of a pintle 27a, to hold the parts in assembled relation. Suitable grease fittings (not shown) are preferably provided on the legs 23a and 23b of the swivel bracket to facilitate introduction of grease into the bores 24b and 27b for lubrication.

Figure 2:
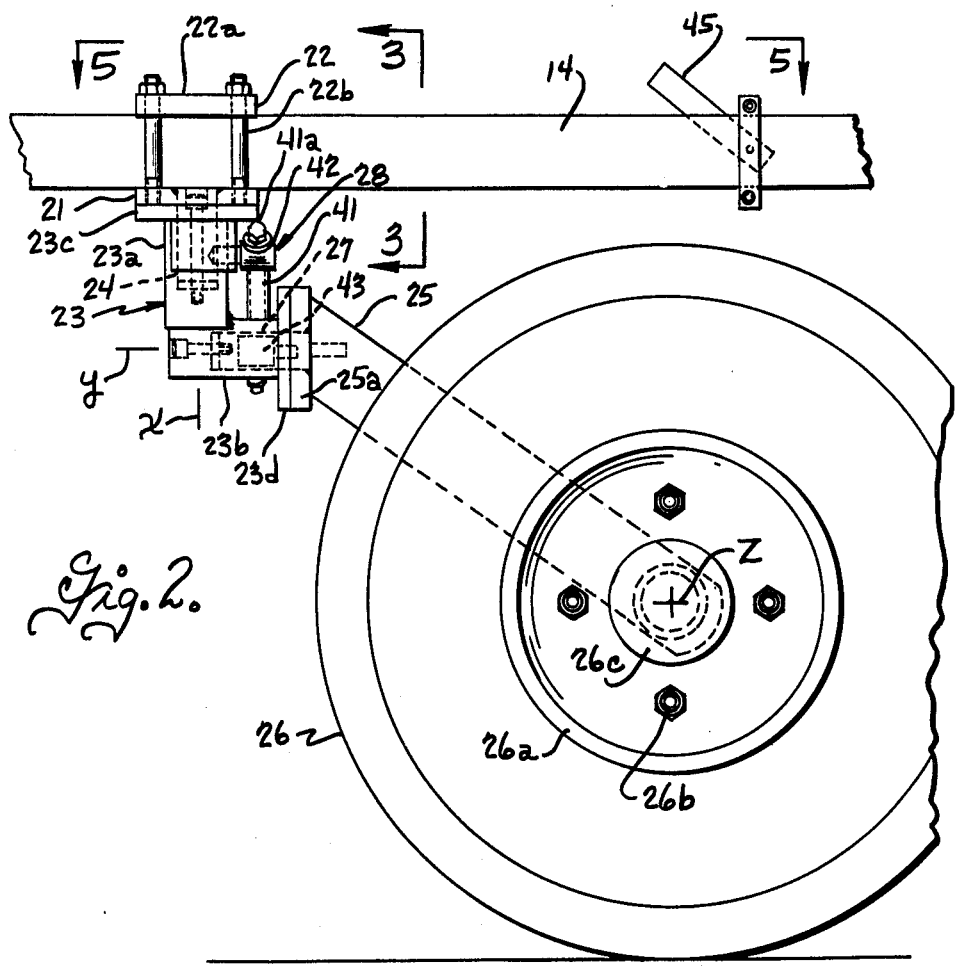
FIG. 2 is a side elevational view of the caster wheel attachment attached to the tongue of a trailer, and showing the parts on a larger scale than FIG. 1.

The wheel support bracket 25 includes an arm 25b attached to the head 25a and extending therefrom at an angle to the horizontal swing axis Y. The wheel 26 is rotatably mounted on the free end of the arm 25b for rotation about an axis Z that is generally horizontal when the wheel support bracket is in its lowered position as shown in FIGS. 2 and 4, and which axis is generally upright when the wheel support bracket is in its raised position as shown in FIG. 5. The wheel 26 is preferably of the same type and size as the trailer support wheels 13 so that it can function as a spare wheel. In the embodiment shown, the trailer support wheels 13 have a rim 13a secured as by studs 13b to the hub 13c that is rotatably mounted on the trailer axle. The trailer axle can conveniently be formed from a pair of stub axles welded or otherwise rigidly secured in opposite ends of a rigid tube. The wheel 26 similarly has a rim 26a that is secured as by studs 26b to a hub 26c. The hub 26c is rotatably mounted as on a stub axle 26d removably secured as by set screws on a collar 26e welded to the outer end of the arm 25b on the wheel support bracket. As best shown in FIG. 3, the arm 25b is laterally offset from the horizontal swing axis Y a distance such that the medial plane through the wheel 26 is substnatially in a plane through the swing axis Y. As shown in FIGS. 1 and 2, the wheel support bracket also supports the wheel with its axis horizontally offset from the upright caster axis X, when the wheel support bracket is in its lowered position. This permits the wheel 26 to swivel or caster about the upright caster axis X when the wheel is in its lowered and intermediate positions.

In the preferred embodiment illustrated in FIGS. 1–6, the wheel bracket retaining means 28 is arranged to enable positive adjustment of the wheel support bracket between its lowered and its raised positions. More particularly, the retaining means 28 includes a screw 41 that is non-slidably and rotatably mounted at one end on a swivel block 42 and which is threadedly connected at its other end to a swivel block 43. One of the swivel blocks such as 42 is mounted on the swivel bracket 22 for turning movement relatively thereto about an axis parallel to and radially spaced from the swing axis Y, and the other swivel block 43 is rotatably supported on the head 25a of the wheel support bracket 25, for turning movement about an axis parallel to and radially spaced from the swing axis Y. The screw 41 has a drive head 41a at one end that engages one side of the swivel block 42 and a thrust bearing 41b that engages the other side of the swivel block 42 to hold the screw against axial movement relative to the swivel block 42 while permitting free rotation thereof. The head 41a is shaped to detachably and non-rotatably receive a crank or wrench and, when the screw is turned, the screw 41 threads either into or out of the swivel block 43 depending on its direction of rotation, to positively and incrementally turn the wheel support bracket relative to the swivel bracket about the swing axis Y. This arrangement is advantageous in that it not only enables positive raising and lowering of the wheel, when the trailer tongue is attached to the vehicle, but also enables raising and lowering the trailer tongue when the wheel 26 is in engagement with the ground, to accommodate vehicle trailer hitches of different height. Moreover, it enables the wheel to be supported in angular positions intermediate the lowered and raised positions, for example as shown in FIG. 4. Since the caster axis X remains upright during adjustment of the wheel about the swing axis Y, the wheel 26 can still function as a caster wheel in these intermediate positions. When the wheel support bracket is adjusted to its fully raised position as shown in FIG. 5, the wheel axis Z is disposed generally upright and parallel to the caster axis X. The wheel and wheel support bracket can then be swung to a position in which the wheel underlies the tongue 14. Any suitable means may be provided for releasably retaining the wheel support bracket 25b in a position alongside the tongue. In the embodiment shown, the projecting end of stub axle 26d is adapted to extend alongside the trailer tongue when the wheel is raised as shown in FIG. 5 and a latch 45 is swingably mounted on the tongue at a location to engage the projecting end of the stub axle, to inhibit swinging of the wheel support bracket when it is in its raised position.

The embodiment shown in FIGS. 7-9 is generally similar to that shown in FIGS. 1-6 and like numerals are used to designate corresponding parts. In this embodiment, a modified wheel bracket retaining means 28' is provided for retaining the wheel support bracket in a raised position. More particularly, a latch pin 41' is slidably mounted on a block 42' and on the flange 23d of the swivel bracket 23 for movement parallel to the swing axis Y, into and out of one or more openings in the head 25a of the wheel support bracket, to releasably lock the wheel support bracket in one or more angularly adjusted positions relative to the swivel bracket. As best shown in FIGS. 8 and 9 one opening 51a in the head of the wheel support bracket is located to receive the latch pin when the wheel support bracket is in its lowered position, and a second opening 51b is arranged to receive the latch pin when the wheel support bracket is in its raised position. Advantageously, one or more intermediate openings herein designated 51c and 51d are provided in the head 25a of the wheel support bracket, to enable locking of the wheel support bracket to the swivel bracket in angular positions intermediate the lowered and raised positions. The latch pin is yieldably biased into its latched position as by a spring 43' interposed between the block 42' and a collar 44' on the latch pin, and a knob 45' is provided on the free end of the latch pin to facilitate retraction of the pin.

From the foregoing it is thought that the construction and operation of the retractable caster wheel for trailers will be readily understood. The swivel bracket 22 is mounted on the stationary mounting bracket 21 for swivel movement about an upright caster axis X and the wheel support bracket 25 is mounted on the swivel bracket for turning movement relative thereto about a horizontal swing axis Y between a lowered position shown in FIGS. 1 and 3 and a raised position shown in FIG. 5. In the lowered position the wheel axis Z is generally horizontal and transverse to a plane through the swivel axis and swing axis, and the wheel axis is also horizontally offset from the swivel axis at a level below the swing axis so that the wheel 26 can caster or swivel relative to the trailer tongue. When the wheel support bracket is in its raised position, the wheel axis Z is generally upright as shown in FIG. 5 and horizontally offset from the caster axis. The caster axis, however, remains upright during movement of the wheel support bracket between its lowered and raised positions so that the wheel can function as a caster wheel at positions angularly intermediate the full lowered and full raised positions, for example as shown in FIG. 4. This enables supporting the trailer tongue at different heights, to accommodate vehicle trailer hitches of different heights. In the embodiments of FIGS. 1-6, the wheel support bracket is positively and incrementally adjustable between its lowered and raised positions. This not only facilitates raising and lowering of the wheel when the tongue is attached to a vehicle, but also enables raising and lowering the trailer tongue, when the wheel 26 is in engagement with the ground. The wheel 26, hub 26c, stub axle 26d and the wheel bearings are advantageously of the same size and type as the trailer wheels so that the wheel 26, hub 26c, and wheel bearings can function as spare parts.

While we have shown and described certain embodiments of the invention, it is to be understood that it is capable of many modifications. Changes therefor, in the construction and arrangement may be made without departing from the spirit and scope of the invention as disclosed in the appended claims.

The embodiments of the invention in which an exclusive property or privilege is claimed are defined as follows:

1. In a wheeled trailer having a tongue adapted for connection to a towing vehicle, a retractable wheel support for the tongue comprising: a stationary mounting bracket and means for rigidly attaching the stationary mounting bracket to the trailer tongue, a swivel bracket, means mounting the swivel bracket on the mounting bracket for turning movement relative thereto about a generally upright swivel axis, a wheel support bracket and a wheel rotatably mounted on the wheel support bracket, means mounting the wheel support bracket on the swivel bracket for turning relative thereto about a generally horizontal swing axis between a lowered position in which the wheel axis is generally horizontal and a raised position in which the wheel axis is generally upright, and means acting between the swivel bracket and the wheel support bracket selectively operable to retain the wheel support bracket in said lowered position relative to said swivel bracket.

2. A wheeled trailer according to claim 1 wherein the wheel axis is spaced below and horizontally offset from said upright swivel axis when the wheel support bracket is in said lowered position.

3. A wheeled trailer according to claim 1 wherein said upright swivel axis is disposed below said tongue and is laterally centered relative thereto.

4. A wheeled trailer according to claim 1 wherein said last-mentioned means includes manually operable means for positively adjustably turning said wheel support bracket relative to said swivel bracket between said lowered and raised positions.

5. A wheeled tailer according to claim 1 wherein said last-mentioned means includes a manually operable screw means engageable with a part on said swivel bracket and a part on said wheel support bracket and operative when rotated to positively adjustably turn said wheel support bracket between said lowered and raised positions.

6. A wheeled trailer according to claim 1 wherein said last-mentioned means includes latch means on one of the items comprising the swivel bracket and the wheel support bracket and keeper means on the other of said items for releasably latching said wheel support bracket to said swivel bracket at least in said lowered position.

7. A wheeled trailer according to claim 6 wherein said latch means and said keeper means is arranged to also latch said wheel support bracket to said swivel bracket in at least one other position intermediate said lowered and raised positions.

8. In a wheeled trailer having a tongue adapted for connection to a towing vehicle, a retractable wheel support for the tongue comprising: a stationary mounting bracket and means for rigidly attaching the stationary mounting bracket to the trailer tongue, a swivel bracket, a first means mounting the swivel bracket on the stationary mounting bracket for turning movement relative thereto about a generally upright swivel axis, a wheel support bracket and a wheel rotatably mounted on the wheel support bracket, second means mounting the wheel support bracket on the swivel bracket for turning relative thereto about a generally horizontal swing axis between a lowered position and a raised position, said wheel support bracket in said lowered position supporting the wheel with its axis generally horizontal and transverse to a plane through said swivel axis and said swing axis and horizontally offset from the swivel axis and at a level below said swing axis, said wheel support bracket in said raised position supporting the wheel with its axis generally upright and horizontally offset from the swivel axis, and means acting between the swivel bracket and the wheel support bracket selectively operable to retain said wheel support bracket in said lowered position relative to the swivel bracket.

9. A wheeled trailer according to claim 8 wherein said last-mentioned means includes a manually operable screw means engageable with a part on said swivel bracket and a part on said wheel support bracket and operative when rotated to positively adjustably turn said wheel support bracket between said lowered and raised position.

10. A wheeled trailer according to claim 8 wherein said last-mentioned means includes latch means on one of the items comprising the swivel bracket and the wheel support bracket and keeper means on the other of the items for releasably latching said wheel support bracket to said swivel bracket at least in said lowered position.

11. A wheeled trailer according to claim 10 wherein said latch means and said keeper means is also arranged to latch said wheel support bracket to said swivel bracket in at least one other position intermediate said lowered and raised positions.

12. A wheeled trailer according to claim 8 wherein said wheel support bracket includes a head mounted on said swivel bracket for turning about said swing axis and a single arm having one end rigid with said head and extending along only one side of the wheel, a stub shaft rigidly mounted on the other end of the arm to extend laterally therefrom in cantilever fashion and a wheel mounting hub rotatably mounted on the stub shaft.

13. A wheeled trailer according to claim 12 wherein said arm is laterally offset from said swing axis a distance such that a medial plane through the wheel is substantially in a plane through the swing axis and swivel axis.

14. A wheeled trailer according to claim 8 wherein said first means includes a first pintle on one of the items comprising the mounting bracket and the swivel bracket and a socket on the other of those items rotatably receiving the pintle, said second means comprising a pintle on one of the items comprising the swivel bracket and the wheel support bracket and a socket on the other of those items rotatably receiving the pintle.

* * * * *